United States Patent
Shimada et al.

(10) Patent No.: US 8,712,164 B2
(45) Date of Patent: Apr. 29, 2014

(54) IMAGE PROCESSING APPARATUS, IMAGE REGISTERING METHOD, PROGRAM CAUSING COMPUTER TO EXECUTE IMAGE REGISTERING METHOD, AND RECORDING MEDIUM IN WHICH PROGRAM IS RECORDED

(75) Inventors: Koji Shimada, Fukuchiyama (JP); Mai Takami, Sakai (JP)

(73) Assignee: Omron Corporation, Kyoto (JP)

( * ) Notice: Subject to any disclaimer, the term of this patent is extended or adjusted under 35 U.S.C. 154(b) by 1523 days.

(21) Appl. No.: 11/936,427

(22) Filed: Nov. 7, 2007

(65) Prior Publication Data

US 2008/0219593 A1   Sep. 11, 2008

(30) Foreign Application Priority Data

Nov. 8, 2006   (JP) .................................. 2006-302949

(51) Int. Cl.
   *G06K 9/48*   (2006.01)
(52) U.S. Cl.
   USPC ........................................................ 382/199
(58) Field of Classification Search
   USPC ......... 382/199, 209, 217, 218, 219, 220, 224, 382/225, 173, 176, 177, 178, 293, 294
   See application file for complete search history.

(56) References Cited

U.S. PATENT DOCUMENTS

| 5,926,568 A | 7/1999 | Chaney et al. |
| 7,239,740 B1 | 7/2007 | Fujieda |
| 2006/0110047 A1 * | 5/2006 | Reissman et al. ............. 382/218 |

FOREIGN PATENT DOCUMENTS

| EP | 1 388 738 | 2/2004 |
| EP | 1 598 778 | 11/2005 |
| GB | 2 389 178 | 12/2003 |
| JP | 05-054144 | 3/1993 |
| JP | 07-129770 | 5/1995 |
| JP | 2000-148974 | 5/2000 |
| JP | 2002-133427 | 5/2002 |
| JP | 2002-230549 | 8/2002 |
| JP | 2003-109004 | 4/2003 |
| JP | 2005-228062 | 8/2005 |
| JP | 2006-072913 | 3/2006 |
| WO | WO99/52072 | 10/1999 |

* cited by examiner

*Primary Examiner* — Brian Le

(74) *Attorney, Agent, or Firm* — Foley & Lardner LLP

(57) ABSTRACT

An image processing apparatus according to an aspect of the invention includes an LCD touch panel and a central control circuit. The LCD touch panel includes a display unit and an input unit. The central control circuit which is of an image processing unit performs a searching process for searching a portion having high similarity between a registered image and a processing target image and a registering process for producing and registering the registered image. The central control circuit deals with an input image as the processing target image when the searching process is to be performed, the central control circuit causes the display unit to display the input image when the registering process is performed, and the image processing unit draws an image used to produce the registered image unit based on operation of the input unit while overlapping the image with the input image displayed on the display.

10 Claims, 12 Drawing Sheets

(Example) Edge region is not assigned
Fig. 7A
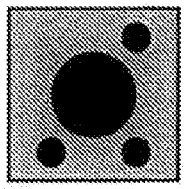
Produce edge image
Fig. 7B
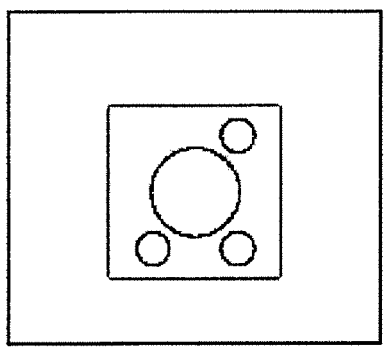
Extract effective pixel having binarized level or more
Fig. 7C
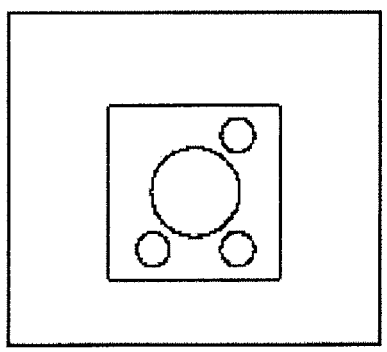
Fig. 8
Graph of edge image distribution
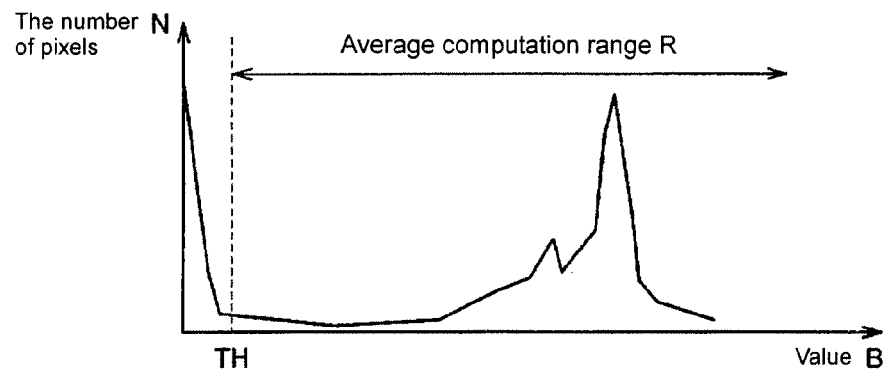

IMAGE PROCESSING APPARATUS, IMAGE REGISTERING METHOD, PROGRAM CAUSING COMPUTER TO EXECUTE IMAGE REGISTERING METHOD, AND RECORDING MEDIUM IN WHICH PROGRAM IS RECORDED

This application claims priority from Japanese Patent Application 2006-302949, filed on Nov. 8, 2006. The entire content of the aforementioned application is incorporated herein by reference.

BACKGROUND OF THE INVENTION

1. Field of the Invention

The present invention relates to an image processing apparatus, an image registering method, a program which causes a computer to execute the image registering method, and a recording medium in which the program is recorded. More Particularly the invention relates to model setting means used in geometrical matching in an image processing technique.

2. Description of the Related Art

There are various kinds of image processing apparatus in which a camera image screen taken by a camera and a setting item screen including character strings and icons are simultaneously displayed on a monitor (multidisplay). A visual sensor, which detects the presence or absence of an object using the camera image taken by the camera or makes a discrimination of a shape or a size of the object by measuring the object, can be cited as an example of the image processing apparatus.

For example, Japanese Patent Application Laid-Open Nos. 2006-72913, 2000-148974, 2002-230549, 2002-133427, and 2005-228062 disclose such pieces of circuit board inspection apparatus to which the visual sensors are applied.

In some pieces of apparatus to which the visual sensor is applied, geometrical information is utilized in a technique of searching an already-registered image (master model) for a measuring target image. As used herein, the geometrical information shall mean information on the shape of the image (focusing on edge information).

Conventionally, in order to correctly perform a matching process in which the geometrical information is used, it is necessary to produce a master model in which the geometrical information is properly extracted.

In the master model, it is necessary to extract only useful information from the image taken on any condition. In the image taken on any condition, it is necessary to remove unnecessary information to extract only the proper geometrical information. Unfortunately, the technique of extracting the proper geometrical information is difficult to achieve.

An object of the invention is to provide an image processing apparatus in which the geometrical information as the master model can be set by a simple operation, an image registering method, a program which cases a computer to execute the image registering method, and a recording medium in which the program is recorded.

SUMMARY OF THE INVENTION

In a first aspect of the invention, an image processing apparatus includes a display unit; an input unit which imparts an input from an operator; and an image processing unit which performs a searching process for searching a portion having high similarity between a registered image and a processing target image and a registering process for producing and registering the registered image. The image processing unit deals with an input image as the processing target image when the searching process is to be performed, and causes the display unit to display the input image and draws an image used to produce the registered image based on operation of the input unit while overlapping the image with the input image displayed on the display unit when the registering process is to be performed.

Preferably, the registered image is an edge image. The input unit is capable of assigning a position on an image displayed on the display unit. The registering process includes a process for extracting an edge image from a part of the input image specified by the position assigned by the input unit.

Preferably, the input unit is capable of assigning a position on an image displayed on the display unit. The registering process includes a process for adding an image drawn based on operation of the input unit to the registered image.

Preferably, the registered image is an edge image. The input unit is capable of assigning a position on an image displayed on the display unit. The registering process includes a process for extracting an edge image from the input image and a process for adding an image drawn based on operation of the input unit to the extracted edge image.

Preferably, the input unit is capable of assigning a position on an image displayed on the display unit, and the registering process includes a process for deleting a part of the registered image specified by the position assigned by the input unit.

Preferably, the input unit is a touch panel formed on the display unit. In the image processing apparatus according to the first aspect of the invention, preferably the input unit includes a pointing device.

In a second aspect of the invention, a method for registering an image on an image processing apparatus includes a display unit and an input unit which imparts input from an operator, the image processing apparatus performs a searching process for searching a portion having high similarity between a registered image and a processing target image and a registering process for producing the registered image. The image registering method includes the steps of causing the display unit to display an image registering method; and drawing an image used to produce the registered image based on operation of the input unit while overlapping the image with the input image displayed on the display unit.

Preferably, the registered image is an edge image. The input unit is capable of assigning a position on an image displayed on the display unit. The image registering method further includes a step of extracting an edge image from a part of the input image specified by the position assigned by the input unit.

Preferably, the input unit is capable of assigning a position on an image displayed on the display unit. In the drawing step, the image drawn based on operation of the input unit is added to the registered image when the registered image already exists.

Preferably, the registered image is an edge image. The input unit is capable of assigning a position on an image displayed on the display unit. The image registering method further includes a step of extracting an edge image from the input image, and the drawing step includes a step of adding an image drawn based on operation of the input unit to the edge image when the extracted edge image already exists.

Preferably, the input unit is capable of assigning a position on an image displayed on the display unit. The drawing step includes a step of deleting a part of the registered image specified by the position assigned by the input unit.

Preferably, the input unit is a touch panel formed on the display unit. Preferably, the input unit includes a pointing device.

In a third aspect of the invention, a program causes a computer to execute any image registering method in the second aspect according to the invention.

In a fourth aspect of the invention, a program causing a computer to execute the image registering method in the second aspect according to the invention is recorded in a computer-readable manner in a recording medium.

Accordingly, the invention eliminates the need for the know-how or high learning level for extracting the optimum geometrical information, which allows the optimum recording medium to be set easily and intuitively.

BRIEF DESCRIPTION OF THE DRAWINGS

FIGS. 7A-7C show images of processing results of Steps S23 to S25;

FIG. 8 shows a view for describing automatic computation of a binarized level;

DETAILED DESCRIPTION OF THE PREFERRED EMBODIMENT

Figure 1:
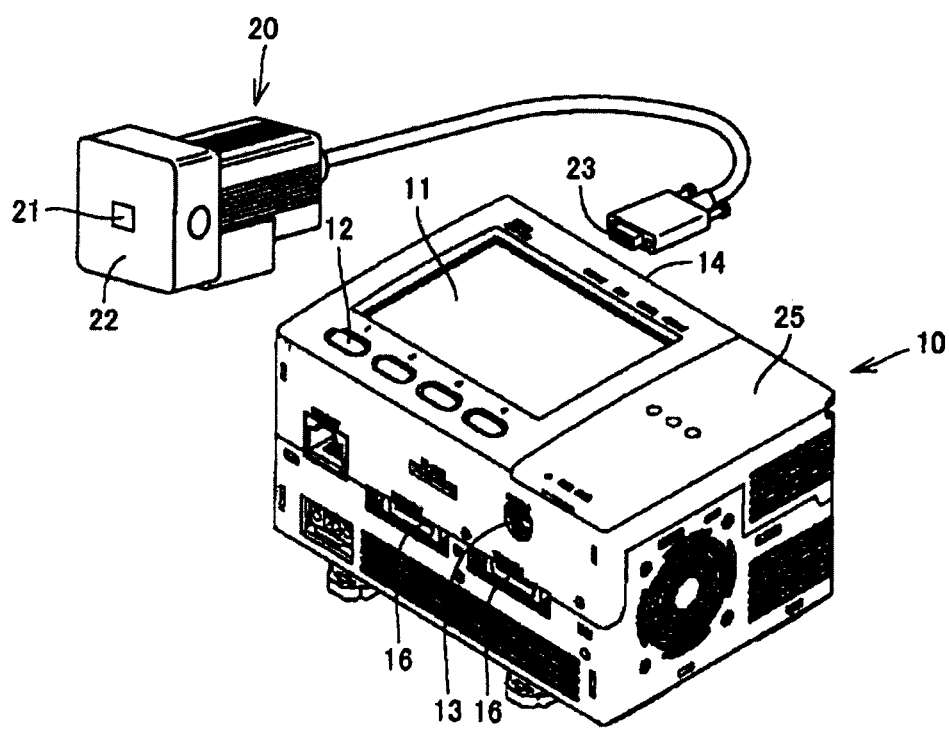
FIG. 1 shows a perspective view of an image processing apparatus according to an embodiment of the invention.

A referred embodiment of the invention will be described in detail with reference to the drawings. In the drawings, the same or equivalent component is designated by the same numeral, and the description thereof is not repeated.

Figure 2:
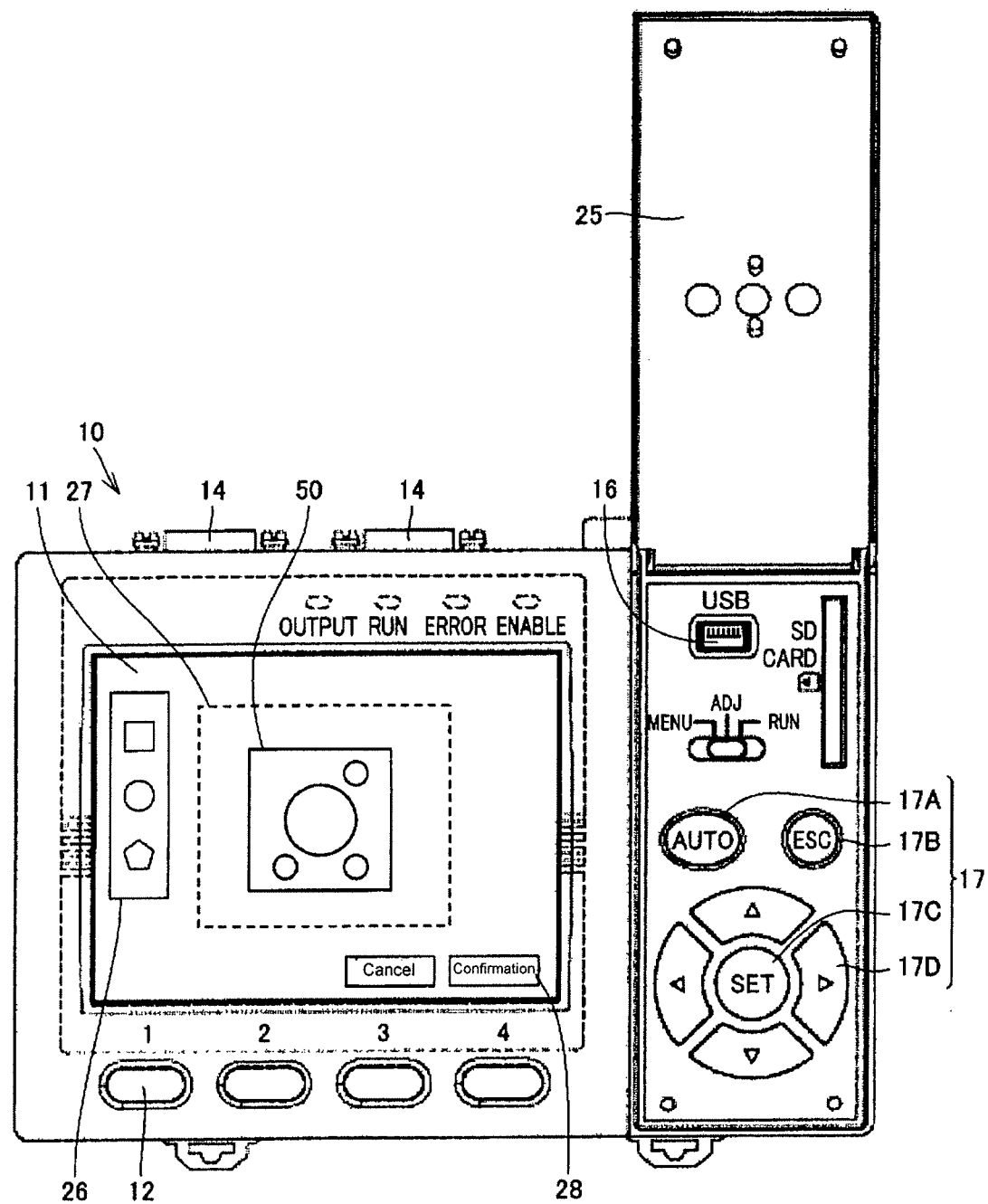
FIG. 2 shows a front view of a controller in the image processing apparatus of FIG. 1.

FIG. 1 shows a perspective view of an image processing apparatus according to an exemplary embodiment of the invention. FIG. 2 shows a front view of a controller 10 in the image processing apparatus of FIG. 1.

Referring to FIGS. 1 and 2, the image processing apparatus includes the controller 10 and a camera unit 20. An input can be done to the controller 10 from a setting button 12, an LCD (Liquid Crystal Device) touch panel 11, and a console connector 13. Measuring parameters and measuring timing can be inputted to the controller 10.

The controller 10 obtains an image taken by a camera unit 20 through a camera interface according to the measuring timing input, and the controller 10 performs measuring process to image data with set measuring parameters and outputs the result. The result is outputted onto an external monitor or a screen of the LCD touch panel 11. Connectors 14 are provided in the camera interface, and two cameras can be connected to the camera interface.

The characters and the pieces of image data are displayed as a setting menu on the screen of the LCD touch panel 11 to easily set various parameters. The LCD touch panel 11 also acts as an input device to select various setting menus and icons displayed on the screen.

A illumination lamp 22 is integral with the camera unit 20, the illumination lamp 22 is lit at timing set by a user according to the timing input from the controller 10, and the image data taken by an imaging device incorporated into a light acceptance unit 21 is transmitted to the controller 10.

An external input and output interface connector 16 such as USB and SD card and a setting button 17 are provided when an operation unit cover 25 is opened.

The setting button 17 includes an "AUTO" button 17A, an "ESC" button 17B, a "SET" button 17C, and a cursor moving button 17D.

An input image 50 which is of the image used to register the geometrical information is displayed on the screen of the LCD touch panel 11. A registration area 27 is shown around the input image 50. The registration area 27 is a region where the geometrical information is set.

A drawing graphic selection area 26 and a button 28 which provides an instruction such as "cancel" and "confirmation" are also provided on the screen of the LCD touch panel 11. Icons indicating graphics are shown in the drawing graphic selection area 26 to draw the image used to produce the geometrical information as the master model.

The geometrical information can arbitrarily added and deleted, and the addition and registration of the geometrical information are performed according to the input from the LCD touch panel 11 or setting buttons 12 and 17.

Figure 3:
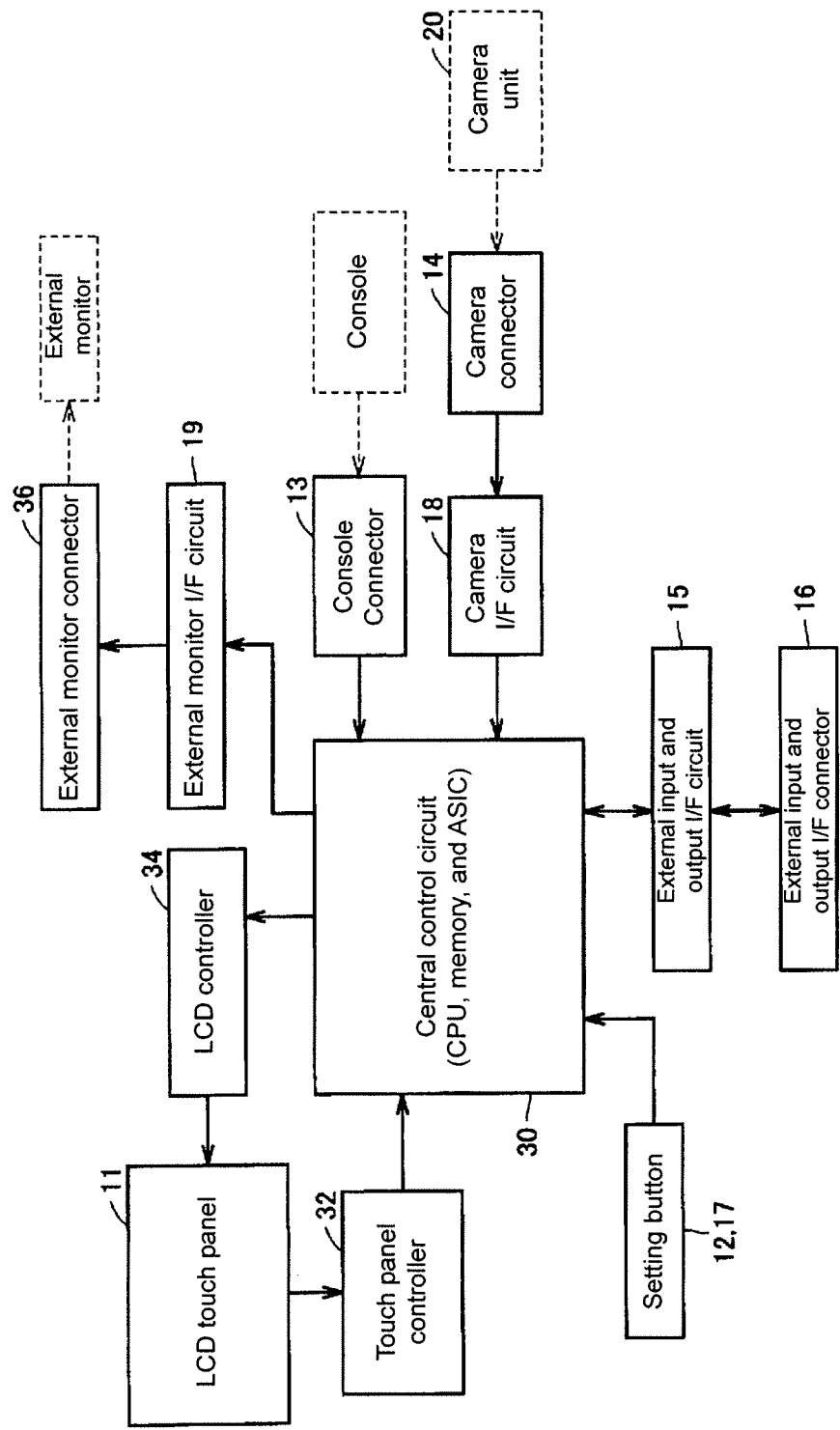
FIG. 3 shows a block diagram of a configuration of the controller.

FIG. 3 shows a configuration of the controller 10.

Referring to FIG. 3, the controller 10 includes a central control circuit 30, an LCD controller 34, the LCD touch panel 11, a touch panel controller 32, the setting buttons 12 and 17, an external monitor interface circuit 19, an external monitor connector 36, and the console connector 13. An external monitor except for the LCD touch panel 11 can be connected to the external monitor connector 36. A console which provides an input instruction instead of the setting buttons 12 and 17 can be connected to the console connector 13.

The controller 10 also includes a camera interface circuit 18, a camera connector 14, an external input and output interface circuit 15, and an external input and output interface connector 16. The two camera units 20 shown in FIG. 1 can be connected to the camera connector 14.

The central control circuit 30 includes CPU, a memory, and ASIC. In the process concerning the setting, the central control circuit 30 performs HMI (Human Machine Interface) control according to the input of the LCD touch panel 11 or setting buttons 12 and 17, a process for automatically extracting the geometrical information, a process for drawing the geometrical information, and a function of displaying the image inputted from the camera unit 20 on the screen of the LCD touch panel 11.

The LCD controller 34 displays the data transmitted from the central control circuit 30 on the screen of the LCD touch panel 11.

The touch panel controller 32 transmits position data on the image, transmitted from the LCD touch panel 11, to the central control circuit 30.

The on and off states of the setting buttons 12 and 17 are inputted to the central control circuit 30.

For example, the external input and output interface circuit 15 is formed by a serial interface circuit such as USB (Universal Serial Bus) and RS-232C/422, a parallel I/O input circuit, or an Ethernet (registered trademark) interface circuit. The external input and output interface circuit 15 conducts communication between the central control circuit 30 and an externally-connected personal computer and PLC (Programmable Logic Controller) through the external input and output interface connector 16.

For example, the camera interface circuit 18 is formed by a LVDS (Low Voltage Differential Signaling) circuit. The camera interface circuit 18 conducts communication of the image data control data between the central control circuit 30 and an externally-connected camera unit 20 through the camera connector 14.

The same image as that on the LCD touch panel 11 integral with the controller 10 can be outputted to the external monitor connected to the external monitor connector 36 through the external monitor interface circuit 19 such as an analog RGB output interface.

The image processing apparatus of FIG. 3 includes the LCD touch panel 11 which has the display unit and the input unit imparting the input from the operator and the central control circuit 30 which is of the image processing unit performing a searching process for searching a portion having high similarity between the registered image and the processing target image and a registering process for producing and registering the registered image. The central control circuit 30 deals with the input image as the processing target image when the searching process is to be performed, the central control circuit 30 causes the display unit to display the input image when the registering process is performed, and the central control circuit 30 draws an image used to produce the registered image while overlapping the image with the input image displayed on the display unit based on the operation of the input unit. The input unit may include a pointing device such as a mouse and a track ball.

Figure 4:
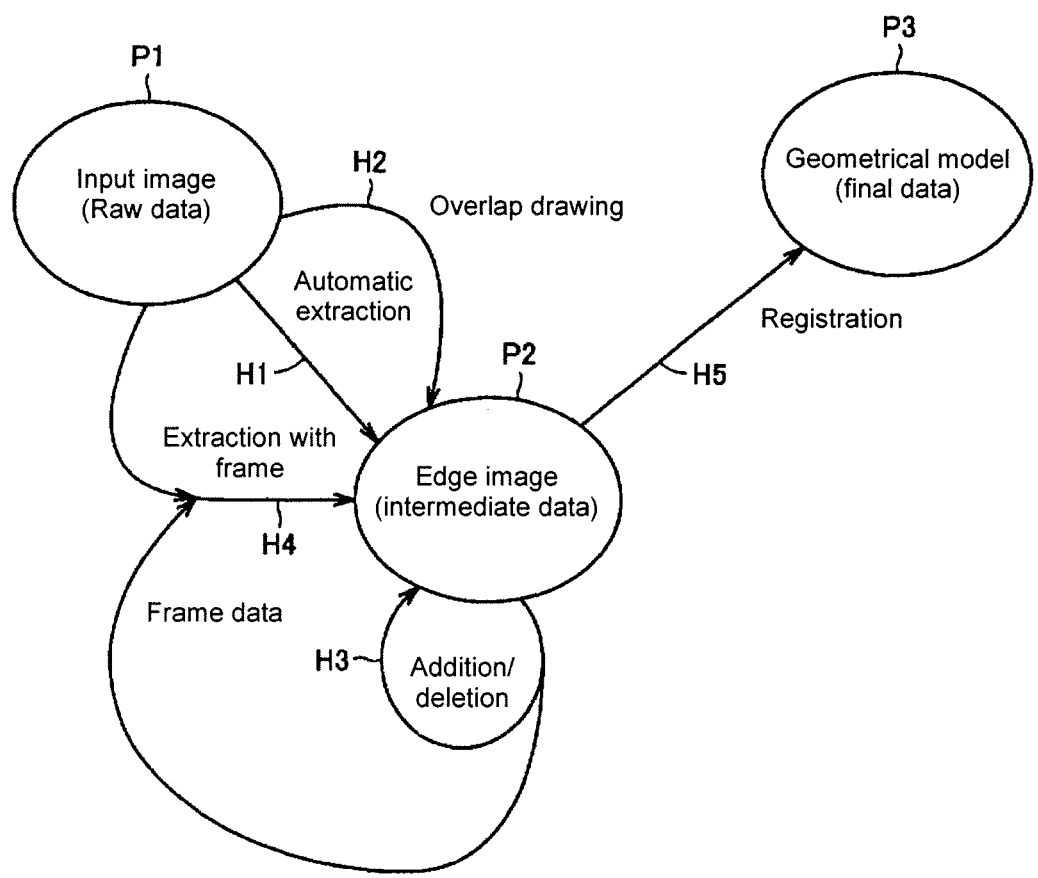
FIG. 4 shows a state transition diagram of image data in the embodiment.

FIG. 4 is a state transition diagram showing transition of the image data in the embodiment.

Referring to FIG. 4, an input image P1 is raw data taken by the camera. An edge image P2 is intermediate data which is extracted from the input image P1 or drawn by referring to the input image P1. A geometrical model P3 is data compared to the input image P1 in performing the measuring process, and the geometrical model P3 is final data produced through the registering process.

Figure 5:
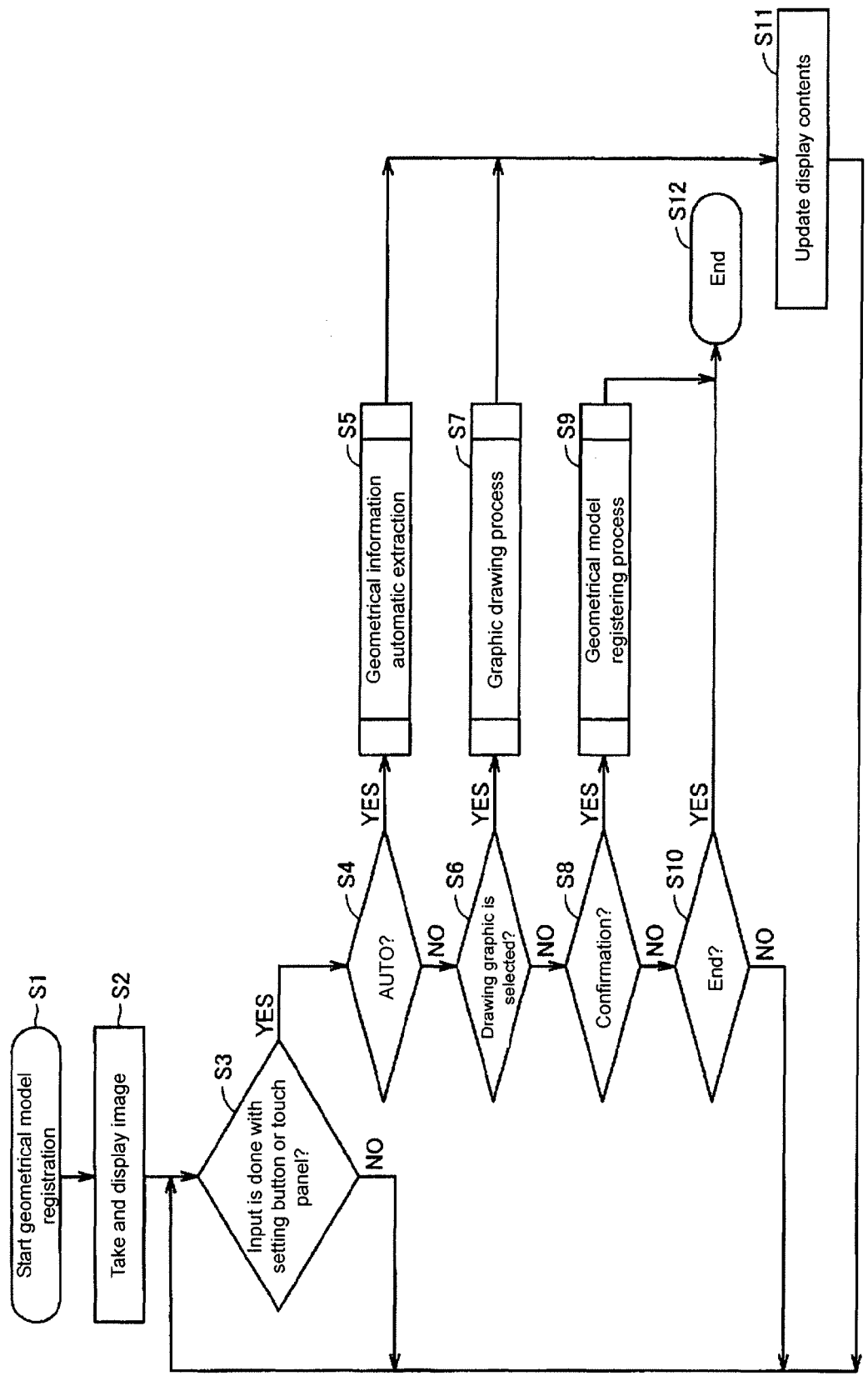
FIG. 5 shows a flowchart of a program control structure for a registering process performed by a central control circuit of FIG. 3.

FIG. 5 is a flowchart showing a program control structure for the registering process performed by the central control circuit 30 of FIG. 3.

A flow for setting the geometrical information will be described with reference to FIGS. 4 and 5.

When a geometrical model registering process is started in Step S1, the input image P1 which becomes a reference for obtaining the geometrical information is taken and displayed on the LCD touch panel 11 in Step S2.

In Step S3, the flow becomes a state waiting for the input from the setting button or touch panel. When the input is done in Step S3, automatic computation of the geometrical information, the drawing or deletion of the geometrical graphic, the update of display content, and the geometrical model registering process are performed depending on the imparted input of the setting button or touch panel.

In Step S4, it is determined whether or not the "AUTO" button 17A is pressed. In Step S6, it is determined whether or not a drawing graphic selection button on the LCD touch panel 11 is pressed. In Step S8, it is determined whether or not the "SET" button 17C is pressed. In Step S10, it is determined whether or not the "ESC" button 17B is pressed.

When the "AUTO" button 17A is pressed in Step S4, the process goes to Step S5 to automatically extract the geometrical information. In the method for automatically extract the geometrical information, a binarized level is automatically computed from an edge image to automatically extract outer shape information. As described later with reference to FIG. 9, the binarized level is computed from density distribution data of the edge image.

When the drawing graphic selection button on the LCD touch panel 11 is pressed in Step S6, a graphic drawing process is performed to display the selected graphic information on the LCD touch panel 11 in Step S7. In the graphic information, a shape, a size, and an inclination can be adjusted according to the input of the setting button or touch panel.

When the process is completed in Step S5 or S7, the flow goes to Step S11 to update display contents on the LCD touch panel 11.

When the "SET" button 17C is pressed in Step S8, it is determined that the edge image P2 is fixed as the final data, and the geometrical model registering process is performed in Step S9. When the geometrical model registering process is completed in Step S9, the geometrical model registration is ended in Step S12.

When the "ESC" button 17B is pressed in Step S10, the setting process is cancelled, and the process is ended in Step S12.

When the "ESC" button 17B is not pressed in Step S10, or when the display contents is not updated in Step S11, the flow returns to Step S3, and the flow becomes the state waiting for the input.

The image registering method of the embodiment is an image registering method performed to the image processing apparatus which includes the display unit and the input unit imparting the input from the operator, and the image processing apparatus performs the searching process for searching the portion having the high similarity between the registered image and the processing target image and the registering process for producing the registered image. The image registering method includes the step (S2) of causing the display unit to display an image registering method; and the step (S7) of drawing the image used to produce the registered image while overlapping the image with the input image displayed on the display unit based on the operation of the input unit.

Figure 6:
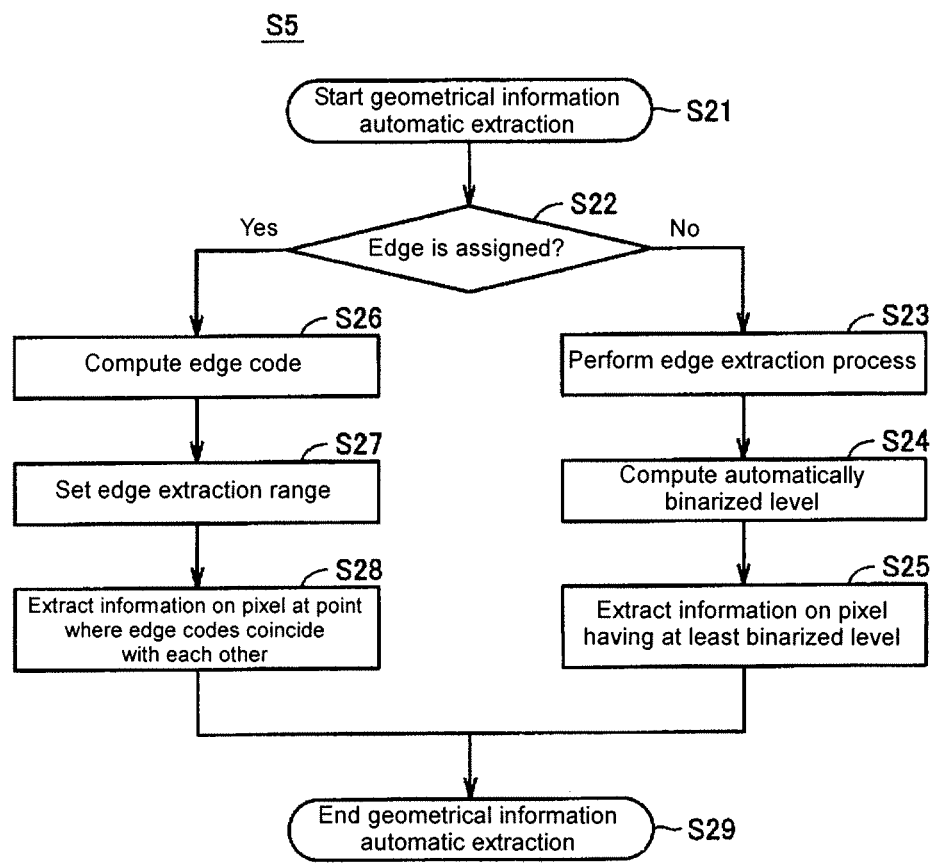
FIG. 6 shows a flowchart of a detailed process for automatically extracting geometrical information performed in Step S5 of FIG. 5.

FIG. 6 is a flowchart showing a detailed process for automatically extracting geometrical information performed in Step S5 of FIG. 5.

Referring to FIG. 6, the process shown in the flowchart is mainly divided into two processing modes. One of the two processing modes is a mode shown in Steps S23 to S25 in which the automatic extraction is performed. The other is a mode shown in Steps S26 to S28 in which the extraction is performed while a range is restricted.

When a geometrical information automatically extracting process is started in Step S21, it is determined in Step S22 whether or not an edge is assigned. That the edge is assigned shall mean the case in which the edge image P2 as the intermediate data of FIG. 4 already exists, and that the edge is not assigned shall mean the case in which the edge image P2 does not exist.

The flow goes to Step S26 when the edge is assigned in Step S21, and the flow goes to Step S23 when the edge is not assigned in Step S21.

In Step S23, the edge image P2 is produced for the input image P1 as shown by an arrow H1. In the process shown by the arrow H1, the edge image P2 is generated through a general-purpose filtering process in which a well-known edge extracting filter such as a Sobel filter and a linear filter is used.

FIG. 7 shows images of processing results of Steps S23 to S25.

In Step S23, an edge image shown in FIG. 7B is generated based on an input image shown in FIG. 7A.

Then, a binarized level automatically computing process is performed in Step S24. In Step S24, the binarized level is automatically computed to extract the edge information which becomes a candidate for the generated edge image.

FIG. 8 shows a view for describing the automatic computation of the binarized level.

In FIG. 8, a horizontal axis indicates a value B (for example, shading is expressed by gray scale of 0 to 255) possessed by each pixel of the edge image, and a vertical axis indicates the number of pixels having the value B in the edge image. FIG. 8 shows a graph of a distribution of the value B in the edge image.

It is assumed that B(x, y) is a pixel value at a coordinate (x, y) in the edge image and TH is an effective pixel determination level for removing a noise component.

The binarized level is computed by the following procedures (1) to (3). (1) The summation SUMB of the values B(x, y) of the pixels distributed in a range where B(x, y)>TH is satisfied is computed in a target rage where the binarized level is computed. (2) An average value is computed by dividing the summation by the number of effective pixels. (3) A half of the average value is fixed as the binarized level.

In Step S25 of FIG. 6, the edge image is binarized using the binarized level computed in Step S24. Then, a binarized image is obtained as shown in FIG. 7C. Therefore, a light portion of the edge image is removed as the noise, and the edge image is also thinned to specify the edge portion. The coordinate information which is larger than the binarized level is stored in the memory as the geometrical information which is of the intermediate data, and the process is ended in Step S29.

The case in which the determination that the edge is assigned is made in Step S22 will be described below. The edge assignment is performed when extraction of the effective pixel shown in FIG. 7 from the whole of the input image is difficult. For example, when not solid color but a pattern exists on a background of the graphic to be extracted, or when a step is formed in the background, it is necessary not to extract the pattern or the step. When the edge is assigned, the extracting process is performed in Steps S26 to S28 while the range is restricted.

Figure 9:
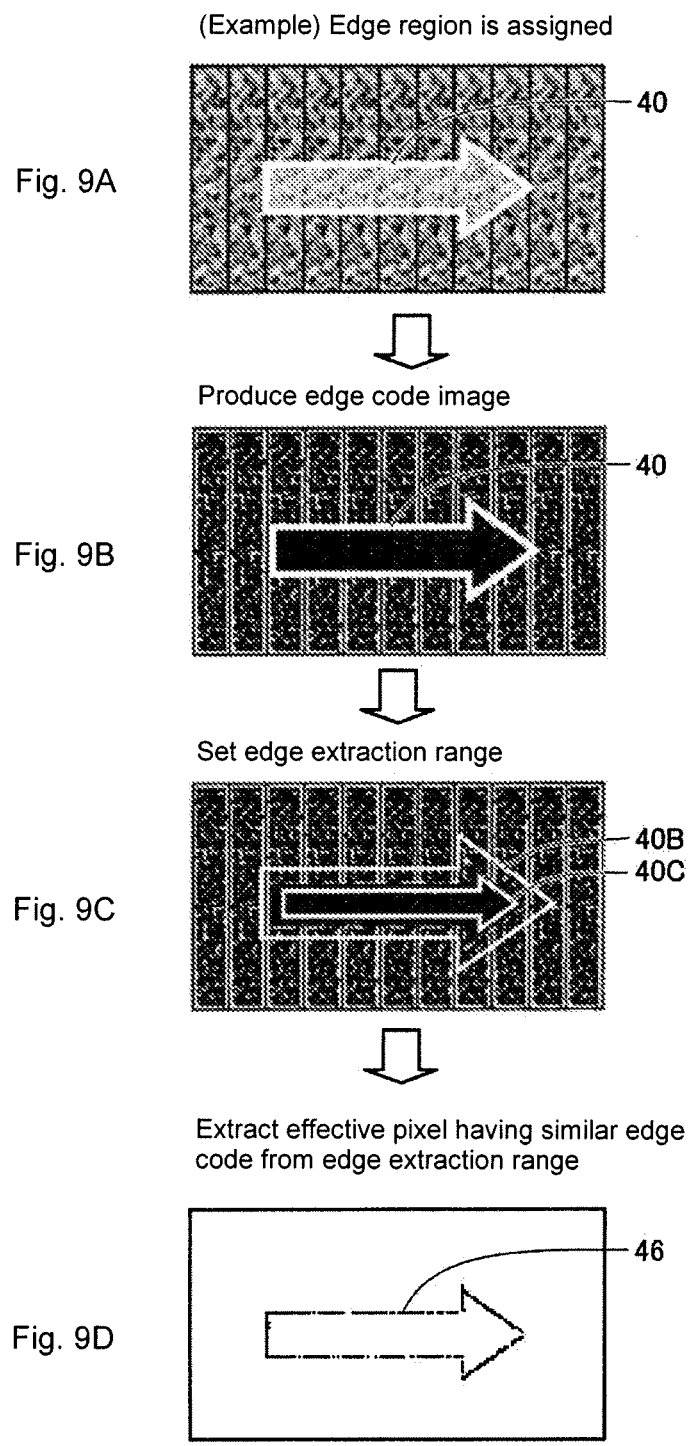
FIGS. 9A-9D show images of processing results of Steps S26 to S28.

FIG. 9 shows images of processing results of Steps S26 to S28.

In FIG. 9A, the input image is displayed, and a state in which region assignment 40 for extracting the edge is already performed is shown on the input image. The input image is an image in which an arrow is printed on a curved surface with vertical stripes. The region assignment 40 is performed to extract the arrow such that the arrow portion is traced. The region assignment is performed based on the graphic drawn in the later-mentioned graphic drawing process in Step S7 of FIG. 5. In the case where the region assignment 40 exists, the flow goes to the processes in Steps S22 to S26.

In Step S26, an edge code is computed for the input image. The edge code shall mean angle data based on a density gradient direction of each pixel in the processing target image (in Step S26, input image) (refer to, for example, Japanese Patent Application Laid-Open No. 2005-228062).

A method for obtaining the edge code and a method for obtaining edge intensity correlated with the edge code will be described below.

A change in density $Ex(x, y)$ in a horizontal direction (x-axis direction) and a change in density $Ey(x, y)$ in a vertical direction (y-axis direction) are obtained in each pixel on the input image. The length $IE(x, y)$ of a combined vector F of vectors indicated by $Ex(x, y)$ and $Ey(x, y)$ is computed from the following equation (1). The length $IE(x, y)$ corresponds to edge intensity.

$$IE(x,y)=\sqrt{((Ex(x,y))^2+(Ey(x,y))^2)} \quad (1)$$

A direction indicated by the combined vector $F=(Ex(x, y), Ey(x, y))$ corresponds to the density gradient direction in a focused pixel. A vector C orthogonal to the vector F indicating the density gradient direction is set to a pixel E located at a predetermined coordinate position (x, y), and it is assumed that the edge code is an angle $EC(x, y)$ indicating the direction of the vector C. The vector F is orientated from a bright portion (high-density portion) toward a dark portion (low-density portion), and the vector C corresponds to a direction in which the vector F is rotated clockwise by 90 degrees. That is, the vector F is orthogonal to a borderline of the input image and the vector C is orientated along the borderline.

The edge code $EC(x, y)$ is expressed based on the vector which is orientated from the pixel E toward the positive direction of the x-axis, and the edge code $EC(x, y)$ is obtained by one of the following equations (2a) to (2e) according to the value of $Ex(x, y), Ey(x, y)$.

In the case of $Ex(x, y)>0$ and $Ey(x, y)>=0$, $$EC(x,y)=a\tan(Ey(x,y)/Ex(x,y)) \quad (2a)$$

In the case of $Ex(x, y)>0$ and $Ey(x, y)<0$, $$EC(x,y)=360+a\tan(Ey(x,y)/Ex(x,y)) \quad (2\text{-}b)$$

In the case of $Ex(x, y)<0$, $$EC(x,y)=180+a\tan(Ey(x,y)/Ex(x,y)) \quad (2c)$$

In the case of $Ex(x, y)=0$ and $Ey(x, y)>0$, $$EC(x,y)=0 \quad (2d)$$

In the case of $Ex(x, y)=0$ and $Ey(x, y)<0$, $$EC(x,y)=180 \quad (2e)$$

The edge code of each pixel in the input image of FIG. 9A is obtained, and FIG. 9B shows an image (hereinafter referred to as edge code image) in which the edge code of each pixel is expressed by the shading or color at the coordinate corresponding to the pixel. It is not particularly necessary that the image at this stage be displayed on the LCD panel. However, for the purpose of the explanation, FIG. 9B shows the image in which the region assignment 40 is overlapped with the edge code image.

When the computation of the edge code is completed in Step S26, a process for computing an edge extraction range is performed to the imparted edge information (region assignment 40) in Step S27.

Figure 10:
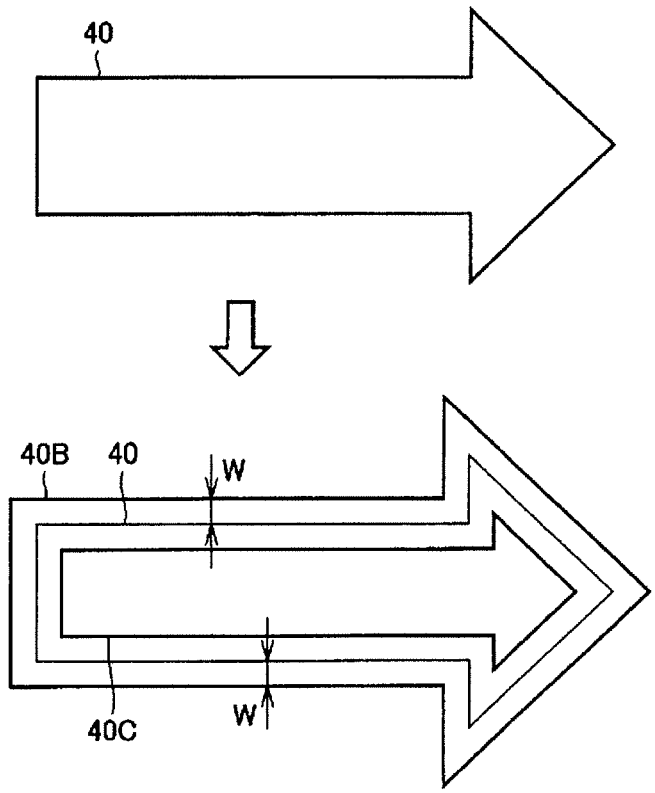
FIG. 10 shows a view for describing computation of an edge extraction range.

FIG. 10 shows a view for describing the computation of the edge extraction range.

Referring to FIG. 10, the imparted edge information is dealt with as the region assignment 40. When the region assignment 40 exists on the screen, the central control circuit 30 generates a line 40B while the region assignment 40 is spread outward by a width W. The central control circuit 30 generates a line 40C while the region assignment 40 is narrowed by the width W. The central control circuit 30 sets a region located between the line 40B and the line 40C to the edge extraction range. FIG. 9C shows a state in which the lines 40B and 40C indicating the edge extraction range are overlapped with the edge code image.

When the setting of the edge extraction range is completed in Step S27, the flow goes to Step S28. In Step S28, the central control circuit 30 extracts pixel information on a point where the edge codes coincide with each other. Specifically, the central control circuit 30 obtains the information on the coordinate having the edge code which coincides with the edge code information possessed by the edge information (original region assignment 40) within the edge extraction range located between the lines 40B and 40C.

As used herein, the edge code shall mean directional information. In other words, the process for obtaining the coordinate of the portion having the same direction (parallel) as the edge information drawn on the input image from the edge code image is performed in Step S28. FIG. 9D shows a state in which the coordinate of the effective pixel whose edge code is similar to that of the original region assignment 40 is extracted from the edge extraction range located between the lines 40B and 40C.

In Step S29, the coordinate information extracted in Step S28 is stored as the geometrical information in the memory, and the geometrical information automatically extracting process performed in Step S5 of FIG. 4 is ended.

In the automatically extracting process, in the case where the already-extracted edge image or the drawn image (edge image P2 of FIG. 4) exists, the extraction region is specified based on the image and the extraction can selectively be performed from the input image P1. In the case where the edge image P2 does not exist, the edge image P2 can be extracted from the whole of the input image P1 (corresponding to an arrow H1 of FIG. 4).

As described above, the registered image includes the edge image. A position at the image displayed on the display unit can be assigned using the touch panel which is of the input unit. The image registering method includes the steps (Steps S26 to S28) of extracting the edge image from a part of the input image which is specified by the position assigned by the input unit.

The graphic drawing process performed in Step S7 of FIG. 5 will be described below.

Figure 11:
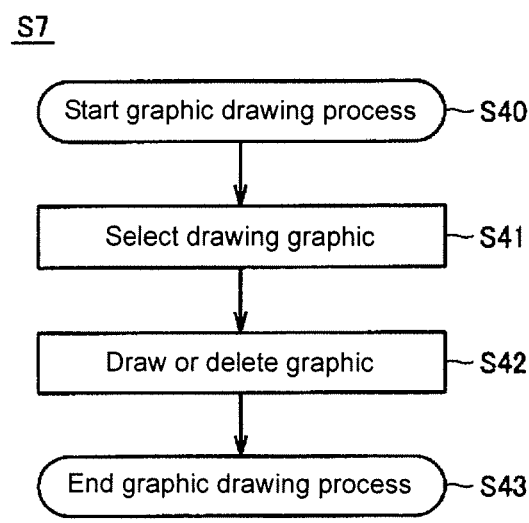
FIG. 11 shows a flowchart of a detailed graphic drawing process performed in Step S7 of FIG. 5.

FIG. 11 is a flowchart showing the detailed graphic drawing process performed in Step S7 of FIG. 5.

Referring to FIG. 11, when the drawing graphic selection button is pressed to start the graphic drawing process in Step S40, the flow becomes a state waiting for the drawing graphic selection in Step S41. In Step S42, the graphic is drawn or deleted based on the inputted contents. In Step S43, the graphic drawing process is ended, and the control is transferred to the flowchart of FIG. 5.

Figure 12:
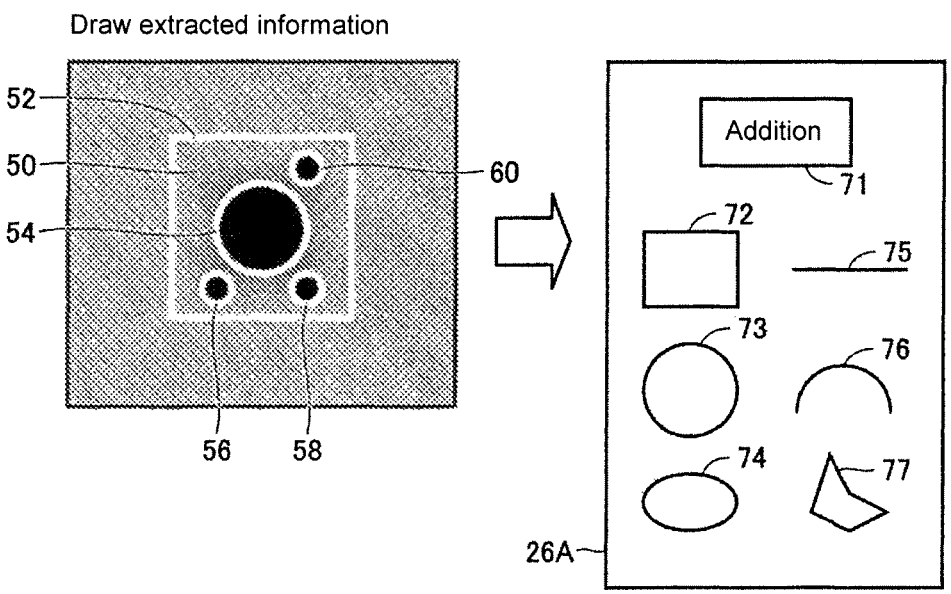
FIG. 12 shows a view for describing a state in which the graphic drawing process is performed in Steps S41 and S42 of FIG. 11.

FIG. 12 shows a view for describing a state in which the graphic drawing process is performed in Steps S41 and S42 of FIG. 11.

The left of FIG. 12 shows a state in which the borderlines 52, 54, 56, 58, and 60 automatically extracted in FIG. 7 are displayed while overlapped with the input image 50. The right of FIG. 12 shows an example 26A in which the graphics are added to the drawing graphic selection area 26 of FIG. 2.

For example, when the central borderline 54 is not successfully extracted from the input image 50, an icon 73 is selected, and is overlapped with the input image 50 to draw the borderline 54. Various assigning methods can be used as the drawing. For example, the coordinates at both ends of a diameter are inputted from the touch panel after the icon 73 is selected, which allows the circle to be drawn. In the case where a part of the graphic is disconnected, the drawing can be performed such that the disconnected part is filled.

When the automatic extraction in Step S5 of FIG. 5 is not successfully performed, the input image 50 is displayed without performing the automatic extraction, the borderline 52 is drawn with a rectangular icon 72 so as to be overlapped with outline of the input image 50, and the borderlines 54, 56, 58, and 60 may be drawn with the circular icon 73.

That is, in the graphic drawing process, in the case where the already-extracted edge image or the drawn image (edge image P2 of FIG. 4) exists, the drawing can additionally be performed in the edge image P2 (corresponding to an arrow H3 of FIG. 4).

On the other hand, in the case where the edge image P2 does not exist, the drawing can be performed from the beginning while viewing the input image (corresponding to an arrow H2 of FIG. 4).

In addition to the circle and rectangle, various shapes can be drawn as the graphic. For example, an ellipse can be drawn with an icon 74, a straight line can be drawn with an icon 75, an arc can be drawn with an icon 76, and a free graphic can be drawn with an icon 77.

That is, a position at the image displayed on the display unit can be assigned using the input unit. In the graphic drawing process in Step S7, the image drawn according to the operation of the input unit is added to the registered image when the registered image already exists.

The image registering method includes the steps (Step S23 to S25) of extracting the edge image from the input image. The graphic drawing process performed in Step S7 includes the step (Step S41 and S42) of adding the image drawn according to the operation of the input unit to the edge image when the extracted edge image already exists.

Figure 13:
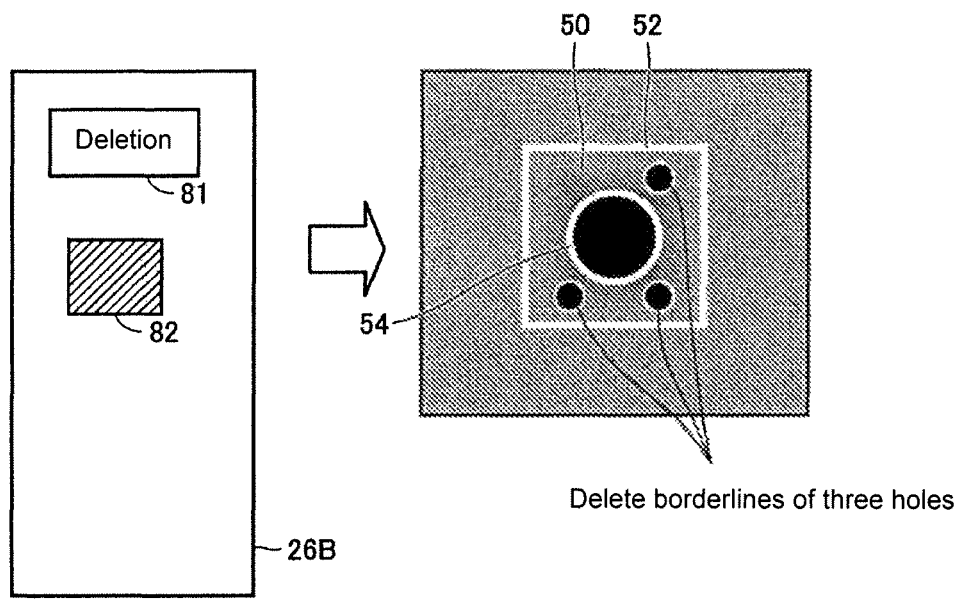
FIG. 13 shows a view for describing a state in which a graphic deleting process is performed in Steps S41 and S42 of FIG. 11.

FIG. 13 shows a view for describing a state in which a graphic deleting process is performed in Steps S41 and S42 of FIG. 11.

Referring to FIG. 13, the left of FIG. 13 shows an example 26B in which the graphics are added to the drawing graphic selection area 26 of FIG. 2. The right of FIG. 13 shows a state in which the borderlines 56, 58, and 60 are deleted in the borderlines 52, 54, 56, 58, and 60 automatically extracted in FIG. 7 while the borderlines 52 and 54 are overlapped with the input image 50.

Sometimes a part of the borderlines indicates necessary information while other borderlines indicate unnecessary information in the automatically extracted borderlines. In the case of a low ratio of the unnecessary information, to selectively delete the unnecessary portions after the extraction is much effective compared to the case of drawing the necessary information as described with reference to FIG. 12.

In such cases, the borderlines 56, 58, and 60 are sequentially surrounded by an icon 82 for deleting the data in the rectangular region in the drawing graphic selection area 26B, and a delete button 81 is pressed, which allows only the necessary borderlines 52 and 54 to be left as the data to be registered.

In the graphic drawing process, in the case where the already-extracted edge image or the drawn image (edge image P2 of FIG. 4) exists, a part of the image can be deleted (corresponding to an arrow H3 of FIG. 4).

That is, the graphic drawing process in Step S7 includes the steps (Steps S41 and S42) of deleting a part of the registered image which is specified by the position assigned by the input unit.

Figure 14:
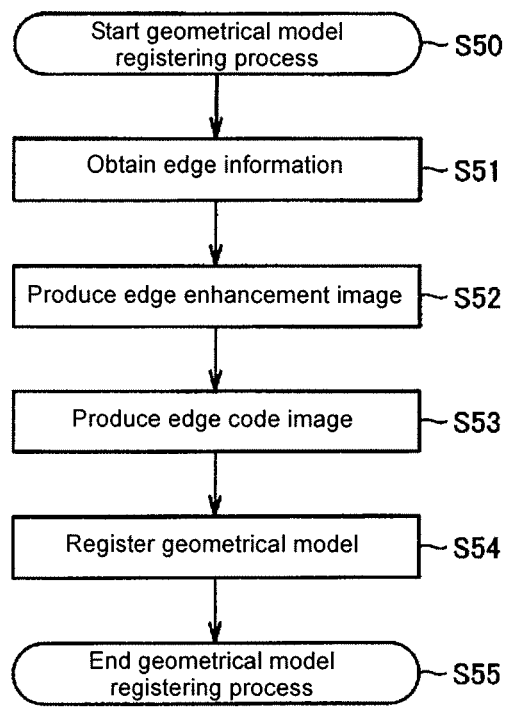
FIG. 14 shows a flowchart of a detailed geometrical model registering process performing in Step S9 of FIG. 5.

FIG. 14 is a flowchart showing the detailed geometrical model registering process performing in Step S9 of FIG. 5.

In the geometrical model registering process, the edge intensity and edge code as a feature quantity are extracted for the drawn graphic information (edge image P2 of FIG. 4). Then, the data correlated with the extracted feature quantity and coordinate information is registered as the geometrical model information.

The geometrical model is defined by various ways such as intensity information on an edge extraction point obtained by image processing and information on the density gradient direction of each pixel. In the present embodiment, magnitude (edge intensity) of the density gradient of each pixel and angle data (edge code) based on the density gradient are shown by way of example.

Referring to FIG. 14, when the geometrical model registering process is started in Step S50, a process for obtaining the edge information is performed in Step S51. As used herein, the edge information shall mean the edge image (intermediate data) P2 of FIG. 4 stored in the memory, and the edge information includes the automatic computation result (result of the geometrical information automatic extraction) and the graphic information obtained by the result of geometrical graphic drawing.

In Step S52, the process for computing the edge intensity is performed in each pixel of the edge image. The edge intensity shall mean the magnitude of the density gradient of each pixel. The method for computing the edge intensity is already described in the equation (1), so that the description is not repeated. Then, the data in which the edge intensity is correlated with the coordinate is produced in each pixel. The data constitutes the edge intensity image.

In Step S53, the process for computing the edge code is performed to each pixel of the edge image. The edge code shall mean the angle data based on the density gradient of each pixel. The method for computing the edge code is already described in the equations (2a) to (2e), so that the description is not repeated. Then, the data in which the edge code is correlated with the coordinate is produced in each pixel. The data constitutes the edge code image.

The computed edge intensity image and edge code image are registered as geometrical model information in Step S54, and the geometrical model registering process is ended (Step S55).

Figure 15:
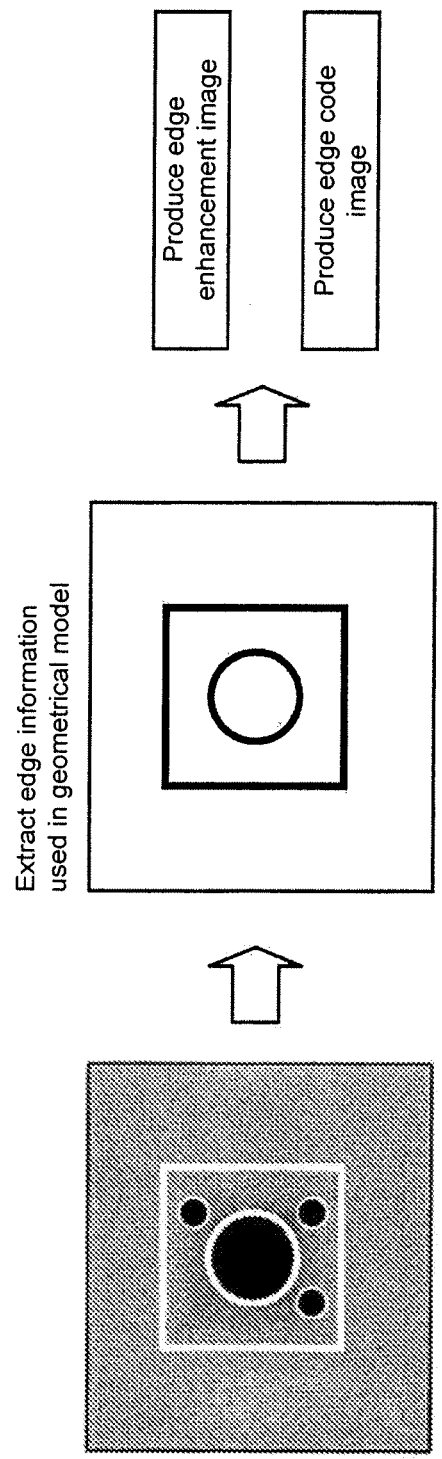
FIG. 15 shows a view for describing a geometrical model registering process.

FIG. 15 shows a view for describing the geometrical model registering process.

Referring to FIG. 15, the edge information is displayed on the screen while overlapped with the input image. When the operator determines that the edge information is registered, the operator provides a registering instruction with the "SET" button. This allows the edge intensity image and the edge code image to be produced from the current edge information, and the edge intensity image and the edge code image are stored in a hard disk drive or a nonvolatile memory of the image processing apparatus.

As described above, in the image processing apparatus of the present embodiment, because a production of the appropriate geometrical information is easily realized for any image, the geometrical information can automatically be extracted from the input image, the unnecessary information can be deleted with the touch panel, and the necessary information can be added with the touch panel. Therefore, working hours are shortened when the image processing apparatus is installed in a plant line.

A program which causes a computer (central control circuit 30 of FIG. 3) to execute the image registering method is also described in the embodiment. The computer can read the program from a recording medium such as an SD card, or the computer can read the program through the external input and output interface circuit.

The embodiment disclosed above is illustrated by way of example only, and the invention is not limited to the embodiment. The scope of the present invention is shown by not the above embodiment but claims, and all changes and modifications equal to and within claims are included in the invention.

What is claimed is:

1. An image processing apparatus comprising:
a display unit;
an input unit configured to receive an input from an operator; and
an image processing unit configured to perform a registering process for producing and registering a geometrical model,
wherein the image processing unit is configured to:
cause the display unit to display an input image;
based on operation of the input unit, render, on the input image, a region assignment that is used to produce said geometrical model to be registered by overlapping the region assignment over the input image displayed on the display unit;
compute edge codes as angle data based on a density gradient direction for each pixel in the input image;
set a region between a first line and a second line as an edge extraction range, wherein during generation of said first line or second line, respectively, the region assignment as edge information is spread outward or narrowed, respectively, by a width W;
extract coordinates of pixels whose edge code is similar to edge code information possessed by the region assignment within said edge extraction range between the first and second lines; and
store the extracted coordinates as the registered geometrical model.

2. The image processing apparatus as in claim 1, wherein the input unit is a touch panel formed on the display unit.

3. The image processing apparatus as in claim 1, wherein the input unit includes a pointing device.

4. The image processing apparatus according to claim 1, further comprising a controller and a camera unit, wherein the controller obtains an image taken by the camera unit through a camera interface according to a measuring timing input and performs a measuring process on the image data with set measuring parameters and outputs the result to the display unit.

5. The image processing apparatus according to claim 4, wherein the input unit is provided to select various setting menus and icons displayed on the display unit.

6. The image processing apparatus according to claim 1, wherein the region assignment constitutes intermediate data extracted from the input image or rendered by referring to the input image.

7. A method for registering a geometrical model on an image processing apparatus including a display unit and an input unit which receives input from an operator,
the image registering method comprising the steps of:
causing the display unit to display an input image; and based on operation of the input unit, rendering, on the input image, a region assignment that is used to produce said geometrical model to be registered while overlapping the region assignment over the input image displayed on the display unit, computing edge codes as angle data based on a density gradient direction for each pixel in the input image;

setting a region located between a first line and a second line as an edge extraction range, wherein during generation of said first line or second line, respectively, the region assignment as edge information is spread outwards or narrowed by a width W;

extracting coordinates of pixels whose edge code is similar to edge code information possessed by the region assignment within the edge extraction range between the first and second lines; and storing the extracted edge image as the registered geometrical model.

8. A non-transitory computer readable medium storing a computer program which causes a computer to execute the image registering method as in claim 7.

9. A non-transitory computer readable recording medium which stores a computer program causing a computer to execute the image registering method as in claim 7 is recorded in a computer-readable manner.

10. The method according to claim 7, further comprising a step of extracting the region assignment from the whole of the input image.

* * * * *